US008845363B2

(12) United States Patent
Ardisana, II et al.

(10) Patent No.: US 8,845,363 B2
(45) Date of Patent: Sep. 30, 2014

(54) REINFORCING BARS IN I/O CONNECTORS

(75) Inventors: John B. Ardisana, II, San Francisco, CA (US); Eric S. Jol, San Jose, CA (US); Jason S. Sloey, Cedar Park, TX (US); Dhaval N. Shah, Fremont, CA (US)

(73) Assignee: Apple Inc., Cupertino, CA (US)

( * ) Notice: Subject to any disclaimer, the term of this patent is extended or adjusted under 35 U.S.C. 154(b) by 1 day.

(21) Appl. No.: 13/607,528

(22) Filed: Sep. 7, 2012

(65) Prior Publication Data

US 2014/0073182 A1     Mar. 13, 2014

(51) Int. Cl.
| | |
|---|---|
| H01R 13/648 | (2006.01) |
| B29C 45/14 | (2006.01) |
| H01R 13/6599 | (2011.01) |
| H01R 43/20 | (2006.01) |
| H01R 13/504 | (2006.01) |
| B29C 45/00 | (2006.01) |

(52) U.S. Cl.
CPC ........ *H01R 13/648* (2013.01); *B29C 45/14639* (2013.01); *B29C 2045/0006* (2013.01); *H01R 13/6599* (2013.01); *H01R 43/20* (2013.01); *H01R 13/504* (2013.01)
USPC ...................................... 439/606; 439/607.35

(58) Field of Classification Search
USPC ............. 439/604, 606, 607.35, 607.4, 607.01
See application file for complete search history.

(56) References Cited

U.S. PATENT DOCUMENTS

| | | | | |
|---|---|---|---|---|
| 4,508,414 | A * | 4/1985 | Kusui et al. ............... | 439/607.47 |
| 4,772,230 | A * | 9/1988 | Berg .............................. | 439/736 |
| 5,368,498 | A * | 11/1994 | Matsuoka et al. ............ | 439/331 |
| 5,872,333 | A | 2/1999 | Uezono et al. | |
| 6,129,558 | A * | 10/2000 | Kihira et al. .................... | 439/66 |
| 6,162,093 | A | 12/2000 | Sudol et al. | |
| 6,343,954 | B1 * | 2/2002 | Facciano et al. .............. | 439/604 |
| 6,428,357 | B1 * | 8/2002 | Dolinshek et al. ............ | 439/606 |
| 6,899,564 | B2 * | 5/2005 | Lee ............................... | 439/606 |
| 7,190,180 | B2 * | 3/2007 | Yamada et al. ........... | 324/755.08 |
| 7,549,873 | B2 | 6/2009 | Hayakawa et al. | |
| 7,699,628 | B2 * | 4/2010 | Fan et al. ......................... | 439/83 |
| 8,187,030 | B2 * | 5/2012 | Matsuoka et al. ............ | 439/542 |
| 8,257,096 | B2 * | 9/2012 | Matsuoka et al. ........... | 439/76.2 |
| 8,282,416 | B2 * | 10/2012 | Imazu et al. ............. | 439/607.04 |

(Continued)

FOREIGN PATENT DOCUMENTS

| | | | |
|---|---|---|---|
| DE | 102008029104 B3 | 1/2010 | |
| FR | 2926403 A1 | 7/2009 | |

OTHER PUBLICATIONS

International Search Report and Written Opinion for International PCT Application No. PCT/US2013/056652, mailed Dec. 4, 2013, 13 pages.

*Primary Examiner* — Gary Paumen
(74) *Attorney, Agent, or Firm* — Kilpatrick Townsend & Stockton LLP (57) ABSTRACT

Reinforcing bars or a reinforcing element with holes can be embedded within the shell of a receptacle connector to strengthen the shell, and potentially provide shielding. For example, a receptacle connector having a plurality of contacts configured to mate with corresponding contacts of a corresponding plug connector can include a shell having an opening for receiving the corresponding plug connector. The shell can include an upper portion and reinforcing bars embedded within the upper portion. The shell can include an upper portion and a reinforcing element with holes embedded within the upper portion. Methods for manufacturing the shell are also provided.

24 Claims, 11 Drawing Sheets

(56) References Cited

U.S. PATENT DOCUMENTS

| | | |
|---|---|---|
| 2001/0012711 A1 | 8/2001 | Sasaki et al. |
| 2004/0142597 A1* | 7/2004 | Mizutani ................. 439/606 |
| 2005/0009383 A1* | 1/2005 | Okura et al. ............... 439/74 |
| 2006/0228946 A1 | 10/2006 | Chung |
| 2008/0108243 A1 | 5/2008 | Corona |
| 2010/0151733 A1 | 6/2010 | Tsou |
| 2011/0076883 A1 | 3/2011 | Jol |
| 2011/0104924 A1* | 5/2011 | Matsuoka et al. ........... 439/271 |
| 2011/0275238 A1* | 11/2011 | Iijima et al. ................ 439/492 |
| 2013/0017729 A1* | 1/2013 | Kimura et al. ............. 439/626 |
| 2013/0078852 A1* | 3/2013 | Mizunuma et al. ........... 439/527 |

\* cited by examiner

REINFORCING BARS IN I/O CONNECTORS

BACKGROUND

The present invention relates generally to input/output electrical connectors, and in particular shells for receptacle connectors.

Many electronic devices include electrical connectors that receive and provide power and data. These electrical connectors are typically receptacle connectors and are designed to receive a male plug connector. The male plug connector may be on the end of a cable. The plug connector may plug into the receptacle connector of an electronic device, thereby forming one or more conductive paths for signals and power.

The receptacle connector often has a shell that surrounds and provides mechanical support for contacts. Receptacle connector shells are typically made from plastics. These contacts may be arranged to mate with corresponding contacts on the plug connector to form portions of electrical path between devices.

These receptacle connectors may be attached or otherwise fixed to device enclosures that surround an electronic device. As electronic devices continue to become smaller, these enclosures have increasingly limited internal space while still including a large number of internal components. Limited space within the enclosures of devices creates a number of challenges. For example, the limited internal space of these enclosures drives the demand for smaller internal components such as smaller receptacle connector shells. However, smaller receptacle connector shells may be prone to breaking due to thinner shell walls, particularly when made of plastic. As another example, a metallic shell may couple with an antenna and cause interference as the dimensions of the device become smaller.

A plastic shell may include glass in a polymer resin, but while this may be used to strengthen the shell, it may also make the shell more brittle and more prone to breaking.

Many devices suffer from all or some of these deficiencies or from similar deficiencies. Accordingly, it is desirable to provide small devices with connectors that are strong and reduce interference.

BRIEF SUMMARY

Various embodiments of the invention pertain to receptacle connector shells for electrical connectors that improve upon some or all of the above described deficiencies. For example, reinforcing bars can be embedded within the shell of a connector receptacle to strengthen the shell and potentially reduce breakage. Reinforcing bars embedded within a shell of a receptacle connector may also serve as shielding for the connector receptacle. Accordingly, some embodiments relate to improved receptacle connector shells that can provide for a smaller, stronger receptacle connector shell, increased Electromagnetic Interference and Electromagnetic Compatibility performance ("EMI/EMC performance"), and increased flexibility in the positioning of an antenna within the enclosure of an electronic device. Other embodiments of the invention pertain to methods of manufacturing receptacle connector shells of the present invention. Although aspects of the invention are described in relation to environments where space within the enclosure of an electronic device is limited, it is appreciated that these features and aspects can be used in a variety of different environments, regardless of space constraints.

According to one embodiment, a receptacle connector for an electronic device is provided. The receptacle connector can include a plurality of contacts configured to mate with corresponding contacts of a corresponding plug connector and a shell having an opening for receiving the corresponding plug connector. The shell can include an upper portion and reinforcing bars embedded within the upper portion.

According to another embodiment, a receptacle connector for an electronic device is provided. The receptacle connector can include a plurality of contacts configured to mate with corresponding contacts of a corresponding plug connector and a shell having an opening for receiving the corresponding plug connector. The shell can include an upper portion and a reinforcing element having holes embedded within the upper portion.

Another exemplary embodiment of the present invention may provide a receptacle connector that may be easily manufactured. A method of manufacturing a receptacle connector is provided. A reinforcing element can be suspended within a die for forming a shell of the receptacle connector. The reinforcing element can be suspended in a region of the die that corresponds to an upper portion of the shell formed by the die. Material can be injected into the die to form at least part of the shell. The shell can be removed from the die.

The receptacle connector shell described herein can be used in a variety of different electronic devices, which may use a variety of different connector technologies. The invention may apply to many commonly used data connectors including standard USB and mini USB connectors, FireWire connectors, as well as many of the proprietary connectors, e.g., Apple's proprietary 30-pin connector, used with common portable electronics. The invention may also apply to internal connectors or other connections between components within the enclosure of an electronic device.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION

Embodiments can provide a connector receptacle for an electronic device having a reinforced shell. The shell can be reinforced with reinforcing elements such as reinforcing bars or rebars. The reinforcing elements can be embedded in a portion of the connector receptacle shell to strengthen the shell. The reinforcing element can be configured in a mesh pattern, thereby allowing the reinforcing elements to provide EMI shielding for the receptacle connector to improve EMI/EMC performance of the electronic device. The shell of the reinforced connector receptacle can be made in an effective manufacturing process.

I. Device and Connector Configuration

Figure 1:
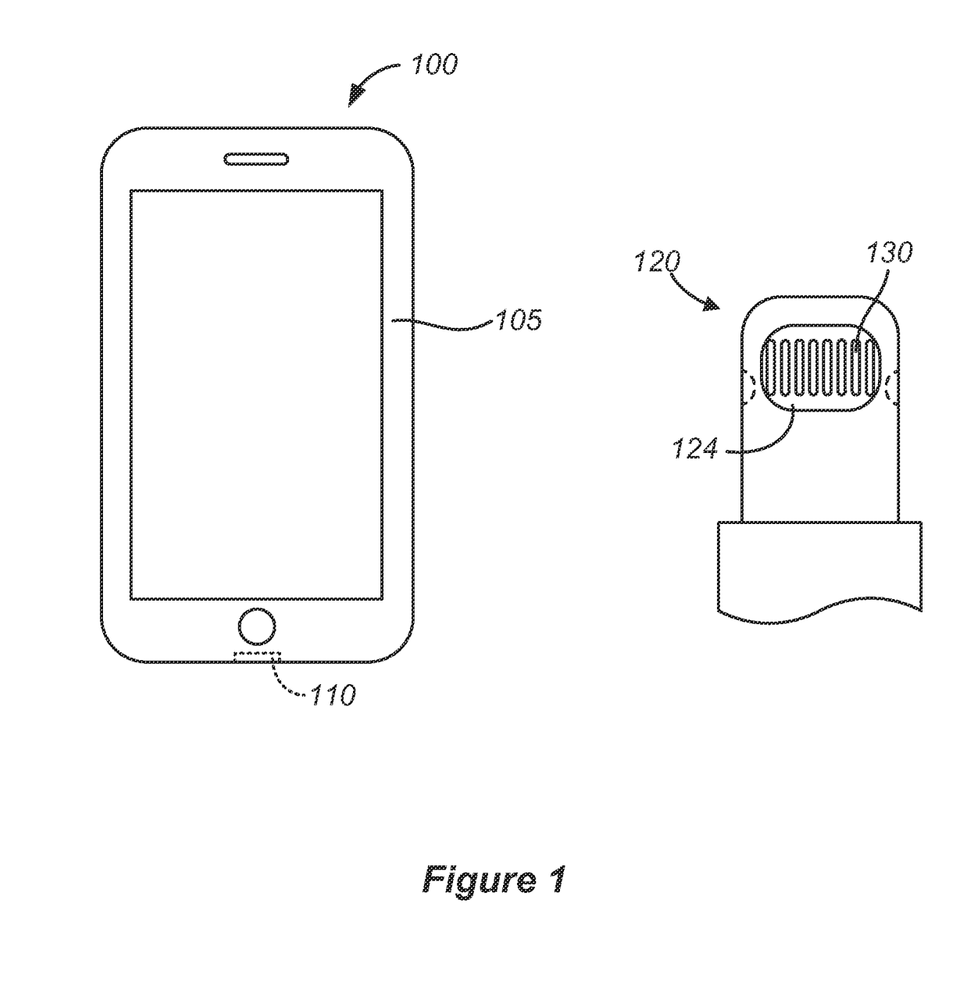
FIG. 1 illustrates a simplified perspective drawing of a host device having a receptacle connector according to embodiments of the present invention.

FIG. 1 is a simplified perspective drawing of a host device 100 having a receptacle connector 110 according to embodiments of the present invention. Host device 100 includes a receptacle connector 110 that may receive a corresponding plug connector 120 via an opening (shown in FIG. 2). The plug connector includes external contacts 130 that can accommodate some or all of video, audio, data and control signals along with power and ground.

Corresponding electrical contacts (shown in FIG. 3) may be located in receptacle connector 110. Plug connector 120 is compatible with receptacle connector 110 of host device 100 that can be, as shown in FIG. 1, a mobile phone. Host device 100 may be a portable computing device; a tablet; a desktop; an all-in-one computer; a cell, smart or media phone; a storage device; a portable media player; a navigation system; a monitor or other electronic device.

As discussed above, electronic devices may include components that are susceptible to EMI. For example, host device 100 may include an antenna. Receptacle connector 110 and plug connector 120, when mated with receptacle connector 110, may each create EMI for an antenna of host device 100 if not properly shielded. In some cases, it may be possible to position a device's antenna to avoid EMI. However, as electronic devices continue to become smaller, there is increasingly limited internal space within devices and thus reduced flexibility in positioning internal components such, e.g., an antenna, to avoid EMI. Additionally, this demand for smaller devices requires internal components, e.g., receptacle connector 110, to be smaller. Smaller receptacle connectors may necessarily have thinner shell walls that may not be thick enough to shield EMI originating from the receptacle connector. Additionally, a smaller receptacle connector may also be prone to breaking due to the thinner shell walls. Accordingly, some embodiments discussed below relate to improved receptacle connector shells that can provide for a smaller, stronger receptacle connector shell, increased EMI/EMC performance, and increased flexibility in the positioning of an antenna within the enclosure of an electronic device, e.g., host device 100.

Figure 2:
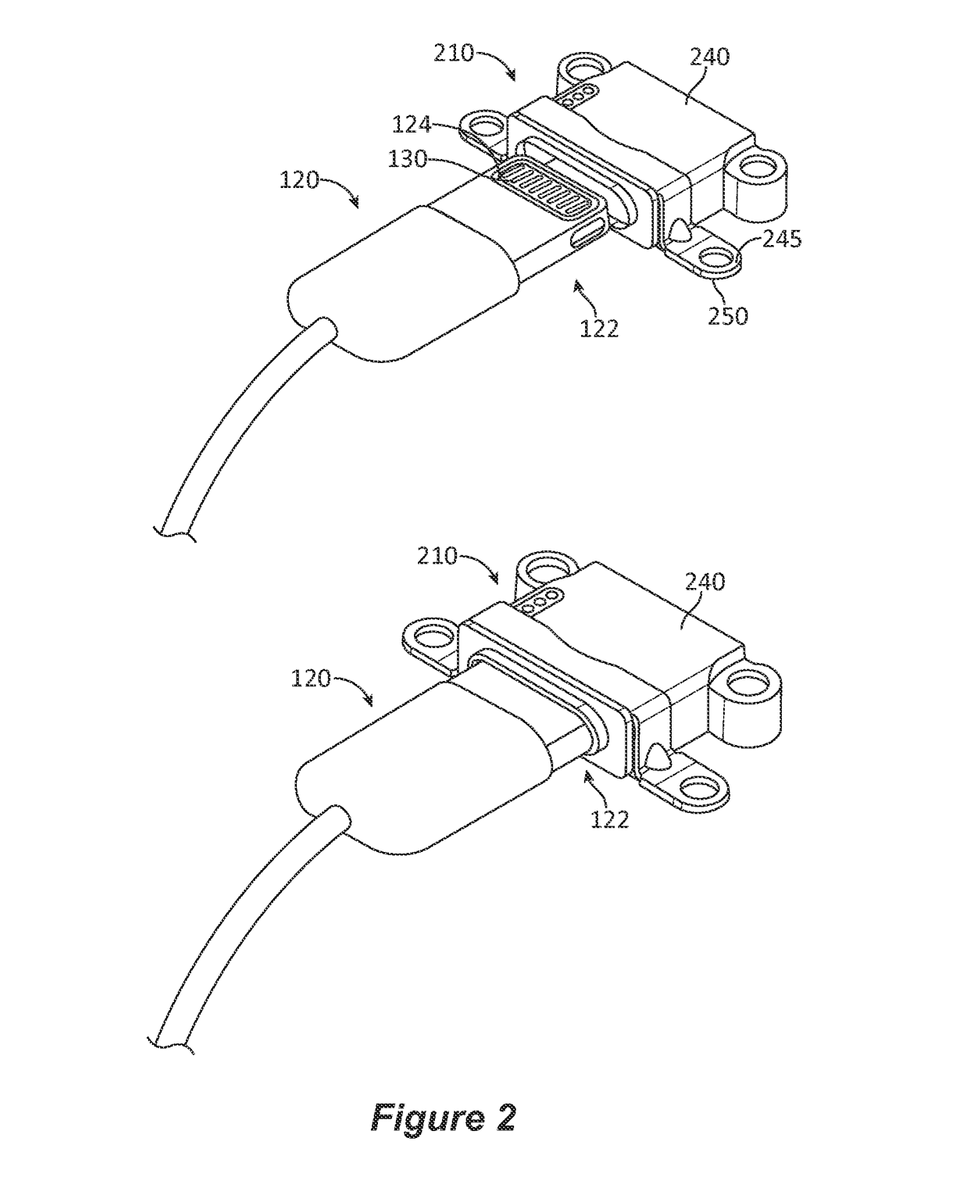
FIG. 2 illustrates a receptacle connector having a plug connector proximate thereto and inserted therein.

FIG. 2 illustrates a receptacle connector 210 having a plug connector 120 proximate thereto and inserted therein. As shown in FIG. 2, plug connector 120 includes a tab 122 having an electrical contact region 124 with a plurality of electrical contacts 130 for electrically coupling to corresponding electrical contacts (shown in FIG. 3) disposed inside receptacle connector 210. Receptacle connector 210 is generally defined by a housing including a shell 240, one or more brackets 245 and 250, and contacts (shown in FIG. 3). Shell 240 is attached to a surface or components on the interior of device 100 (shown in FIG. 1), typically by use of the brackets 245, 250. Shell 240 may be coupled within a device using an upper bracket 245 that extends over the upper portion of the shell 240 and a lower bracket 250 that extends underneath shell 240. The end portions of each bracket 245 and 250 include holes for receiving a screw to facilitate mechanically coupling the shell 240 within a device enclosure, e.g., enclosure 105 (shown in FIG. 1) of device 100 (shown in FIG. 1). Shell 240 may also include additional brackets and/or coupling elements for coupling shell 240 within device 100 (shown in FIG. 1). Plug connector 120 and connector receptacle 110 are connected by inserting tab 122 along insertion axis until the tab 122 is fully inserted into a mated configuration in which electrical contacts 130 and corresponding contacts (not shown in FIG. 2) in receptacle 210 are electrically coupled, as shown in FIG. 2.

II. Connector Shell Including Reinforcement Bars

Reinforcing elements, e.g., rebars, can be embedded within the shell of a connector receptacle to strengthen the shell and increase EMI/EMC performance. Similar to how concrete walls are reinforced by rebars, shells may also be reinforced by rebars. When arranged in a mesh configuration, these rebars may also serve as shielding for the connector receptacle by means of an effect similar to that of a Faraday cage or shield. Hence, a mesh of embedded rebars may block electrical fields like the ones that may cause a device's antenna to couple with a receptacle connector or a mated plug connector. A sheet of metal embedded in a receptacle connector may provide similar shielding, but the sheet metal itself may couple with the device's antenna and create EMI. However, a mesh of rebars may require less metal than a solid structure like sheet metal such that it would be less prone to antenna coupling while still providing similar levels of shielding via an effect similar to that of a Faraday cage. Accordingly, embodiments of reinforcing elements, e.g., rebars, described herein may allow for improvements in both the mechanical domain, e.g., structural strength, and the electrical domain, e.g., EMI/EMC performance.

Figure 3:
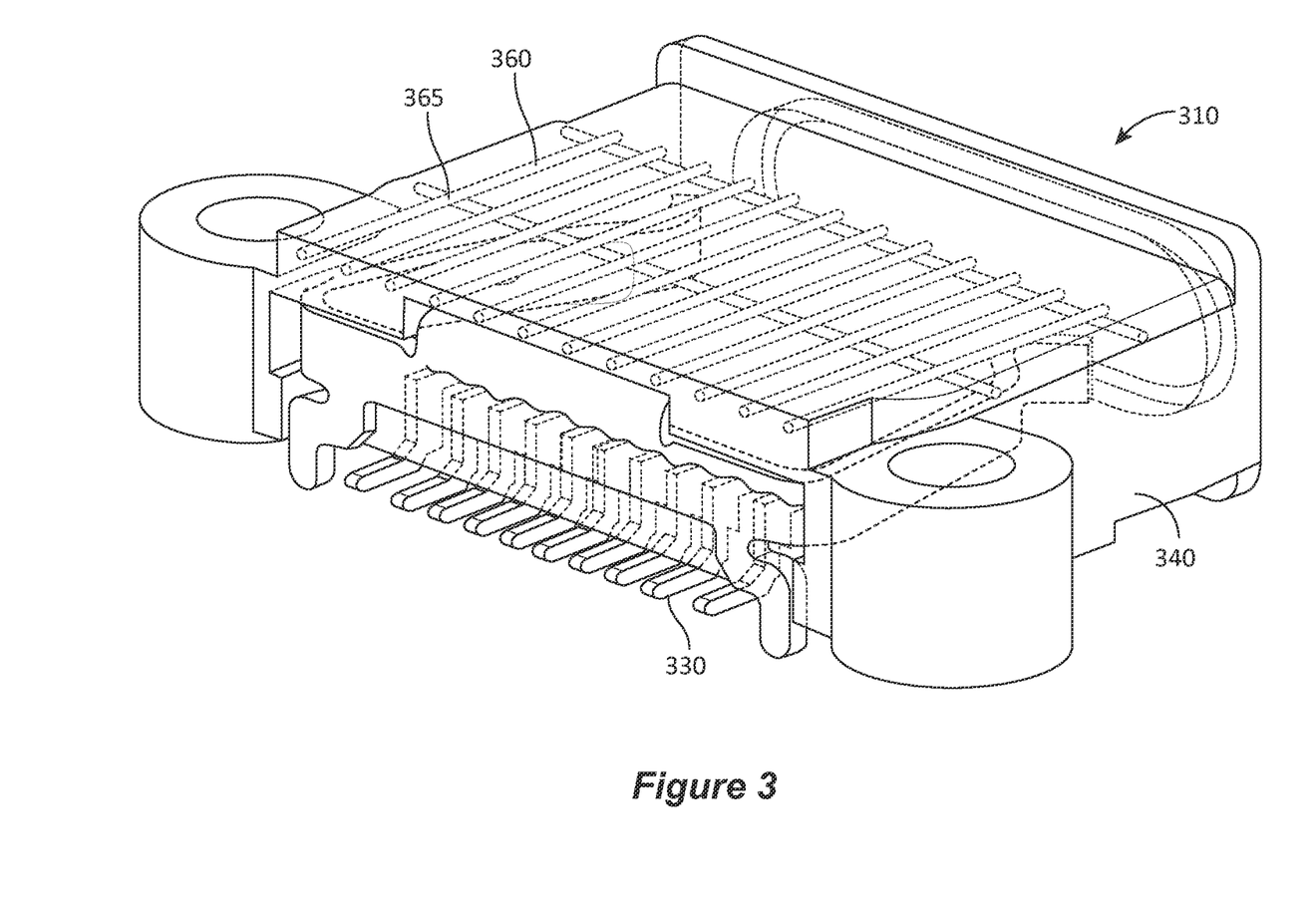
FIG. 3 illustrates a partially transparent perspective view of a receptacle connector shell including a reinforcing element according to embodiments of the present invention.

FIG. 3 illustrates a partially transparent perspective view of a receptacle connector shell including a reinforcing element according to embodiments of the present invention. As shown in FIG. 2, a reinforcing element 360 may include a number of reinforcing bars or rebars. Reinforcing element 360 may be made from a variety of materials including metals, dielectrics, polymers or a combination thereof. Reinforcing element 360 may be made primarily or exclusively from a metal, such as carbon steel. While reinforcing element 360 is shown as including one or more straight rebars in FIG. 3 and other included examples, rebars may have other shapes. For example, rebars may be rectangular, circular, curved, triangular, L-shaped, Z-shaped, U-shaped or otherwise shaped, including other shapes described herein. Additionally, the cross section of the rebars of reinforcing elements discussed herein may be non-circular, e.g., triangular, rectangular, asymmetrically shaped or otherwise shaped. Rebars may have a non-constant cross section where the shape and/or thickness of the rebars may vary about the length of the one or more rebars. Reinforcing element 360 may include more than one rebar, e.g., a mesh of rebars, as discussed below.

A. Parallel Rebars Configuration

As shown in FIG. 3, reinforcing element 360 may be embedded within an upper portion of shell 340. Shell 340 may be made from an insulator material, e.g., polymeric materials such as thermoplastics, thermosets, and/or elastomers, with or without embedded particles such as glass. As shown in FIG. 3, reinforcing element 360 may be in a grid or mesh configuration including parallel bars and overlapping perpendicular bars. These bars may have a circular cross-section and include ridges or other encircling protrusions for better anchoring within shell 340 and ties or welds may be implemented at joints 365 where bars overlap to strengthen the frame of reinforcing element 360. Ties may be implemented using steel wire that is twisted about the intersection point of two or more rebars, e.g., a snap or single tie. Also shown in FIG. 3 are contacts 330 positioned within the lower portion of shell 340 and extending into the opening 315 (shown in FIG. 4) of receptacle connector 310. Contacts 330 may connect to one or more flexible circuit boards, printed circuit boards or other substrates within the host device, e.g., device 100 as shown in FIG. 1.

While reinforcing element 360 of FIG. 3 includes 14 rebars that extend a full or substantial width or length of the upper portion of shell 340, some embodiments of the present invention may include more or less rebars aligned in the width and/or length direction. Furthermore, in other embodiments, the rebars do not extend a full or substantial length or width of the upper portion of shell 340, but rather extend a shorter length or even a longer length.

Figure 4:
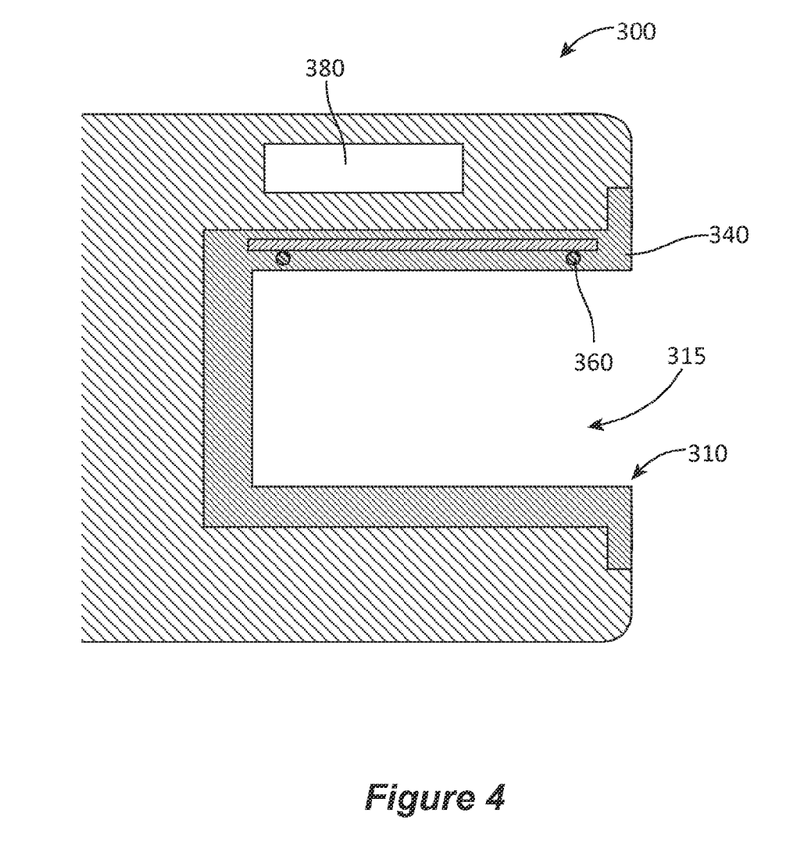
FIG. 4 illustrates a cross sectional view of an electronic device including a receptacle connector according to the embodiment of the present invention as shown in FIG. 3.

FIG. 4 illustrates a cross sectional view of an electronic device including a receptacle connector according to the embodiment of the present invention as shown in FIG. 3. As shown in FIG. 4, reinforcing element 360 may be embedded within an upper portion of shell 340 adjacent to antenna 380 of device 300. Antenna 380 may serve as the exclusive radio frequency (RF) antenna or may be one of many antennas within device 300. Antenna 380 may be any number of antennas used in electronic devices, including a WiFi antenna, a CDMA or GMS antenna, a Global Positioning System (GPS) antenna, or any other antenna implemented in electronic devices. As the position of antenna 380 may vary among electronic devices, so may the position of reinforcing element 360 vary to be adjacent to antenna 380 and embedded in shell 340. The configuration and/or position of reinforcing element 360 may also vary in order to accommodate receptacle connector contacts 330 (shown in FIG. 3), which also may be embedded within shell 340. For example, a reinforcing element may include gaps in its rebar pattern to allow for receptacle connector contacts to protrude through the shell and the reinforcing element unobstructed and make contact with corresponding contacts on a mated plug connector.

As will be discussed in greater detail below, embedded reinforcing elements as discussed herein may provide shielding for a receptacle connector so as to prevent or reduce coupling between an antenna of an electronic device, e.g., antenna 380, and the connector receptacle as well as a mated plug connector. This shielding may be similar to a Faraday cage or shield and may lead to improved EMI/EMC performance of the electronic device.

B. Diagonal Rebar Configuration

Figure 5:
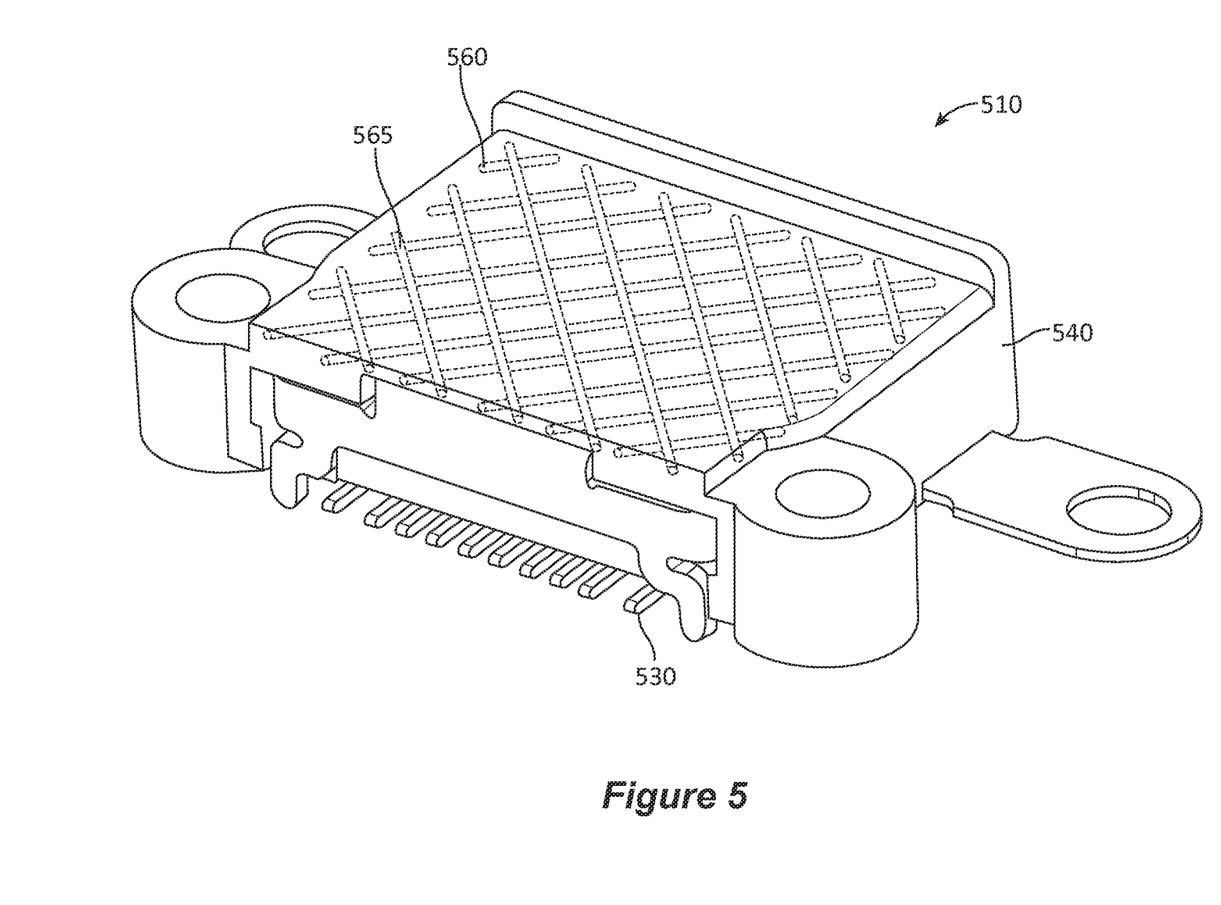
FIG. 5 illustrates a partially transparent perspective view of a receptacle connector according to an embodiment of the present invention.

FIG. 5 illustrates a partially transparent perspective view of a receptacle connector according to an embodiment of the present invention. As shown in FIG. 5, reinforcing element 560 may be configured in a diagonal grid or mesh formation having parallel bars and overlapping perpendicular bars that extend diagonally within an upper portion of shell 540. Reinforcing element 560 of receptacle connector 510 may include ridges, have a circular cross section, and implement ties or welds at joints 565. Reinforcing element 560 includes twenty rebars that are equally spaced and aligned in two different directions, the two directions being perpendicular to one another. Alternatively, the rebars may be aligned in two different directions that are not perpendicular to one another. As another example, more or less rebars may be included in order to create a more or less dense mesh of rebars. As yet another example, the rebars may not be equally spaced and/or may be aligned in more than two different directions.

In some embodiments of reinforcing element 560, the rebars may not extend a full or substantial distance across the upper portion of shell 540, but rather extend a shorter length or even a longer length. Alternatively, some rebars may extend a full or substantial distance across the upper portion of shell 540 while others rebars only extend a partial distance across the upper portion of shell 540.

Similar to the embodiment shown in FIG. 4, reinforcing element 560 may be embedded within an upper portion of shell 540 or another portion of shell 540 adjacent to the antenna of an electronic device. Some embodiments of the invention may include more or less rebars. In other embodiments, the rebars may not extend a full or substantial diagonal length of shell 540, but rather extend a shorter length or even a longer length.

III. Prevention of Damage

Figure 6:
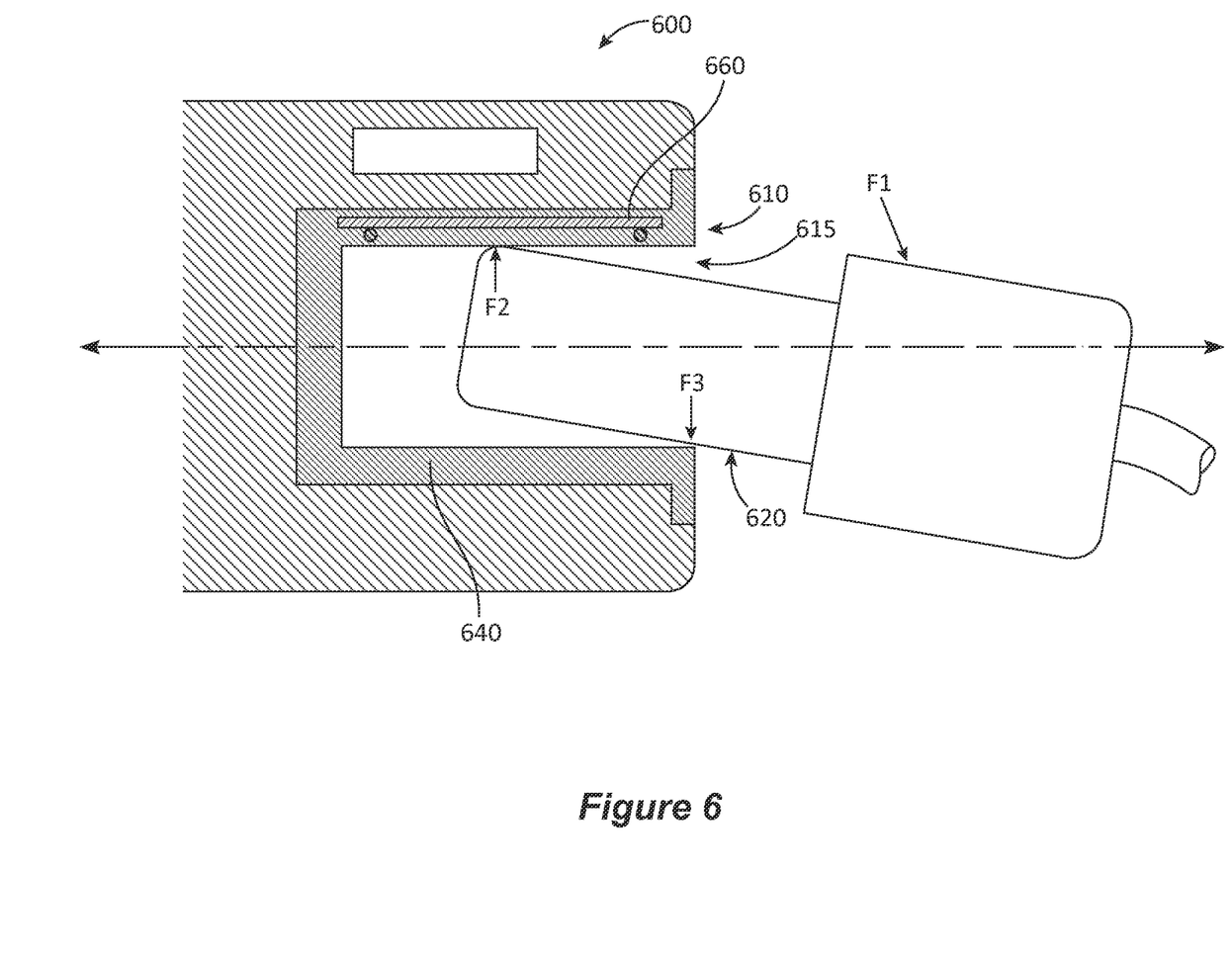
FIG. 6 illustrates a cross sectional view of a plug connector being extracted from a receptacle connector according to an embodiment of the present invention.

FIG. 6 illustrates a cross sectional view of a plug connector being extracted from a receptacle connector according to an embodiment of the present invention. During the use and operation of host device 600, plug connector 620 may be inserted into and extracted from receptacle connector 610 on a regular basis. Each insertion and extraction event may apply forces to the shell 640 that can potentially cause damage to shell 640. While FIG. 6 illustrates a specific force vector, vector F1, applied by a user on plug connector 620 during an extraction event, many different forces may be applied in a number of different ways during extraction events and in yet additional ways during insertion events. For example, as is commonly recommended for extracting connectors from devices, a force may be applied away from host device 600 and in the same direction as the axis of opening 615 of receptacle connector 610. Device 600 may also be dropped or otherwise acted upon so as to apply an unintentional force to plug connector 620, which may be contrary to recommended force applications for the insertion or extraction of plug connector 620.

As shown in FIG. 6, force vector F1—a common, but non-recommended application of force for plug connector extraction—may translate via plug connector 620 and result in other forces being applied to shell 640, e.g., resultant force vectors F2 and F3. For example, force vector F1 may result when a user retracts plug connector 620 from receptacle connector 610 by holding the electronic device with one hand and pulling on the plug connector in the direction of the insertion axis with the other hand, but also applies some incidental torque to plug connector 620 during the retracting process. Force vector F3 may result in the wall of the shell 640 opposite to the wall embedded with reinforcing element 650 experiencing a load at a front edge near opening 615. Force vector F2 may result at the wall of shell 640 embedded with reinforcing element 660 experiencing load at point between a back wall of shell 640 and opening 615. Depending on the magnitude of force vector F1, force vectors F2 and F3 may apply a significant load to shell 640. The application of these significant forces or the continued application of similar less significant forces to shell 640 could potentially cause a catastrophic failure of shell 640.

As discussed earlier, many receptacle connector shells are made from glass filled material, e.g., glass resin, for rigidity and strength. However, glass filled materials may be brittle and lead to catastrophic brittle failures under loads as opposed to slow yielding ductile failures associated with non-filled polymers. By placing rebars, e.g., embodiments of reinforcing element 360 and 560, inside receptacle connectors shells, other non-filled materials may be used that may allow for higher elongation to break and more desirable failure modes. For example, by removing glass particles from a polymer resin, the polymer may retain its elastic properties. These elastic properties may allow shells, e.g., shells 340 and 540, to flex when a load is applied rather than resulting in material failures. The flex or elongation before failure provided by polymers in combination with rebars that help in managing flex may result in a more robust design. As a result of this combination, embodiments of receptacle connector shells discussed herein may have more give and may potentially be less prone to breakage. By increasing the overall strength of connector receptacle shells with rebars, it may be possible for connector receptacle shells to have thinner walls without increasing the risk of material failures.

As discussed earlier, reducing the size of internal components, e.g., reducing wall thickness, may be beneficial in meeting the demand for increasingly smaller device enclosures. Thus, even though increasingly wall thickness is effective in increasing the overall strength of connector receptacle shells, size constraints may prevent thicker walls from being a desirable option or even an option at all. Alternatively, embedded sheet metal in a shell could be used instead of increasing wall thickness to increase strength, but this may result in issues in the electrical domain as discussed below.

IV. Shielding

Figure 7:
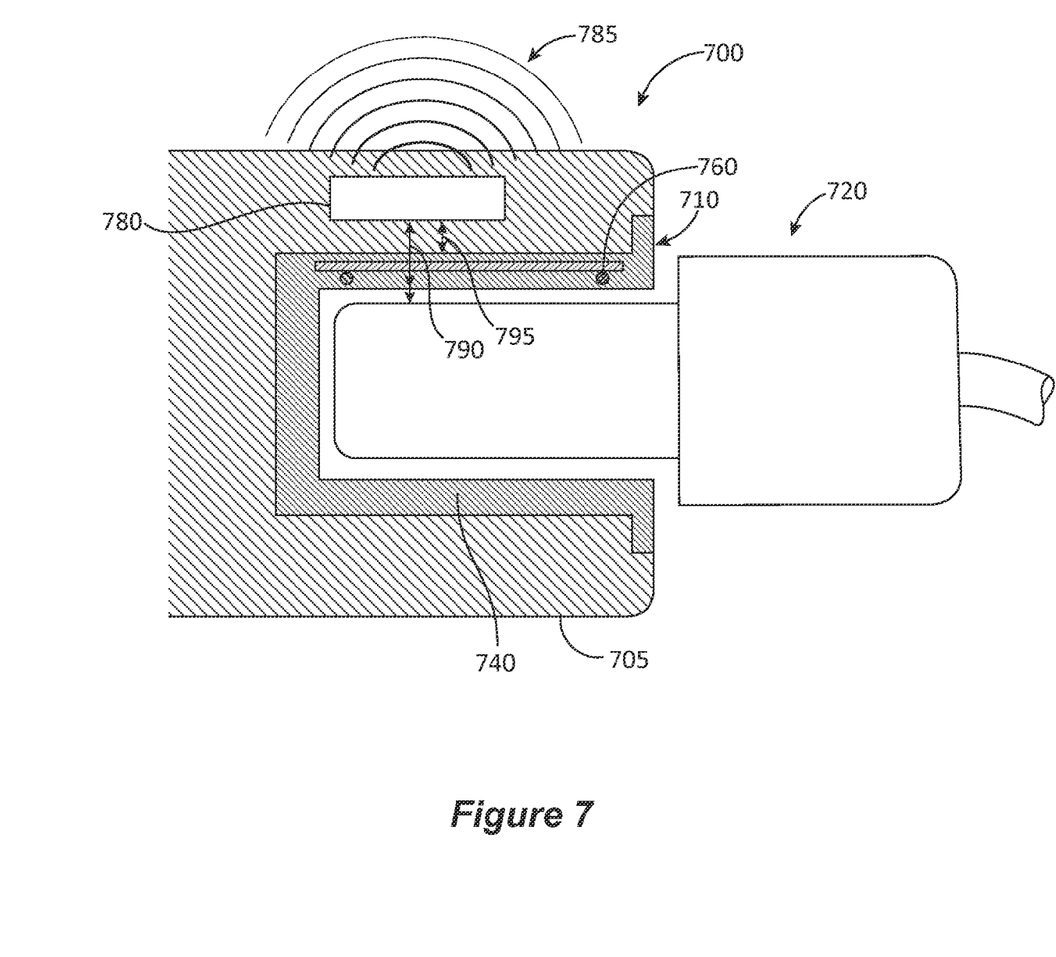
FIG. 7 illustrates a cross sectional view of a plug connector inserted into a receptacle connector according to an embodiment of the present invention.

FIG. 7 illustrates a cross sectional view of a plug connector inserted into a receptacle connector according to an embodiment of the present invention. As discussed above, electrical connectors can reduce the EMI/EMC performance of a device if not properly shielded. For example, receptacle connector 710 either alone or in combination with plug connector 720 may interfere with antenna 780 if not properly shielded. This interference may result from antenna coupling wherein one or more electrically conductive objects, e.g., receptacle connector 710 and/or plug connector 720, interact with radiated electromagnetic waves, e.g., RF waves 785 radiated from antenna 780, and transform the radiated energy into energy conducted by the conductive objectives. In this manner, metal components, wires and other electrically conductive elements of receptacle connector 710 and plug connector 720 may act as unwanted antennas and interfere with the efforts by antenna 780 to send and receive RF waves 785. In FIG. 7, double-headed arrows represent antenna coupling. Antenna coupling 790 represents antenna coupling between antenna 780 and connector 710 and/or plug connector 720. Antenna coupling 795 represents antenna coupling between antenna 780 and the upper portion of shell 740, which includes embedded reinforcing element 760, adjacent to antenna 780 and/or any reinforcing elements embedded within shell 740.

As discussed above, many receptacle connector shells are made from glass resin to provide structural rigidity and strength. However, in some cases, glass resin may not be able to provide sufficient shielding to prevent coupling 790. Inserting molding sheet metal in a receptacle connector shell was discussed above as an alternative means of reinforcing and shielding the receptacle connector. In contrast with glass resin, sheet metal may have the ability to provide sufficient shielding to prevent unacceptable levels of antenna coupling 205. However, while sheet metal may shield antenna coupling 790, the sheet metal may also cause unacceptable levels of antenna coupling 795 and reduce EMI/EMC performance of device 700. As such, sheet metal may not be an appropriate solution in all cases.

As also discussed above, a mesh of rebars, e.g., embodiments of reinforcing elements 360 and 560 (shown in FIGS. 3 and 5, respectively), may provide similar structural advantages to that of embedded sheet metal. However, as shown in FIG. 7, reinforcing element 760 would require much less metal to be embedded in shell 740 because it is not a solid sheet of metal. Hence, using rebar in shell 740 may allow for strategic placement of less metal inside shell 740 such that antenna coupling 195 may be reduced to acceptable levels. In addition, the mesh configuration of embodiments of reinforcing elements still may provide sufficient shielding to prevent unacceptable levels of antenna coupling 790 by means of an effect similar to that of a Faraday cage or shield. A Faradays cage is an enclosure formed by a mesh of conductive material, e.g., reinforcing element 760, that blocks electrical fields like the ones that cause antenna coupling. As such, embodiments of reinforcing elements described herein may allow for improvements in both the mechanical domain, e.g., structural strength, and the electrical domain, e.g., EMI/EMC performance.

In some situations, simply moving the antenna of an electronic device away from the receptacle connector of electronic device may also help to prevent antenna coupling, e.g., antenna coupling 790 and/or 795. However, as discussed above, other design constraints may make moving antennas not always possible or may result in other challenges. Hence, the use of reinforcing elements as described may allow for greater flexibility in designing an electronic device by not necessitating that the device's antenna be located away from the receptacle connector in order to achieve acceptable EMI/EMC performance.

V. Additional Variations

Figure 8A:
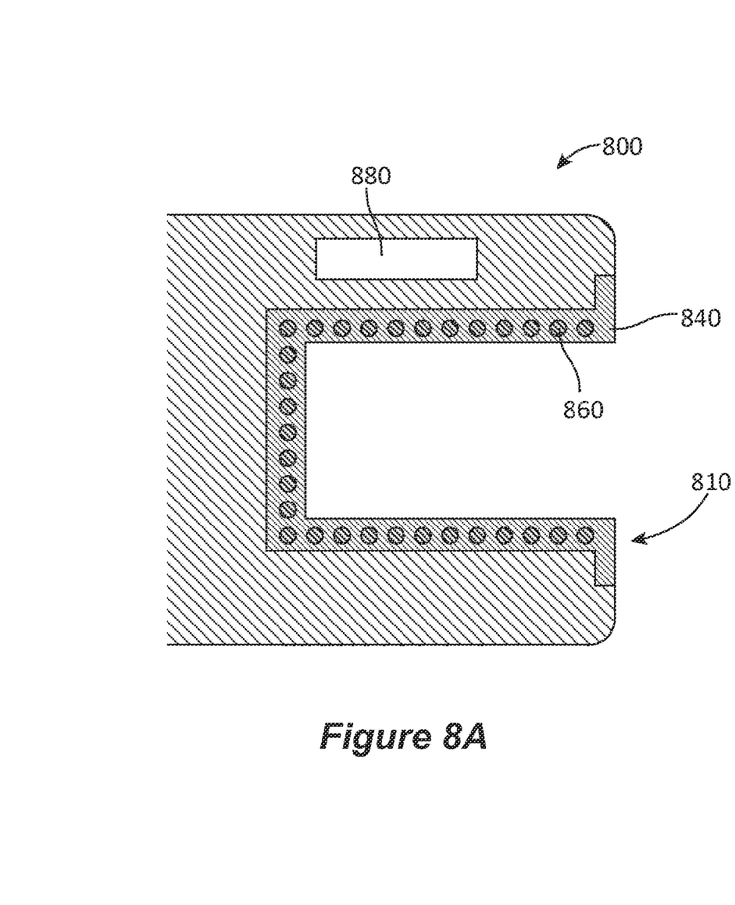
FIGS. 8A-8B illustrate additional embodiments of reinforcing elements according to the present invention.
Figure 8B:
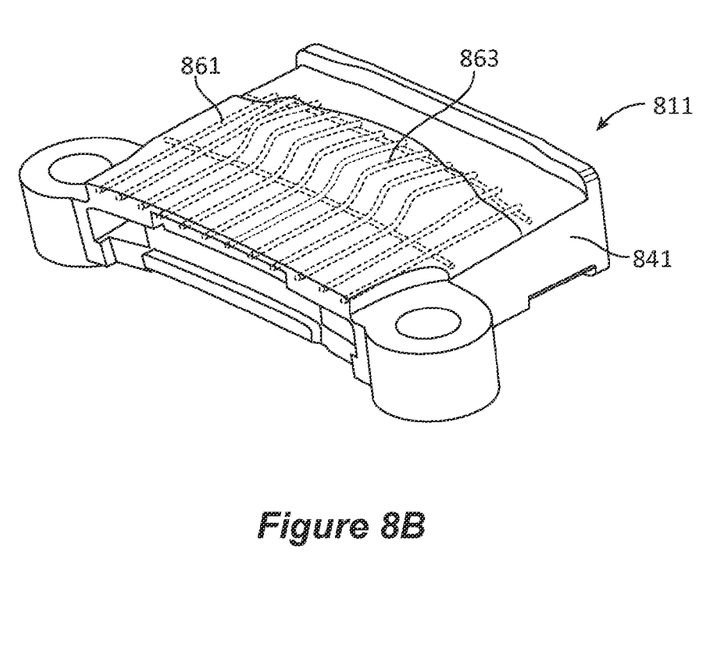

FIGS. 8A-8B illustrate additional embodiments of reinforcing elements according to the present invention. Reinforcing elements may be varied in a number of ways other than those discussed above. For example, FIG. 8A shows reinforcing element 860 of receptacle connector 810 embedded in at least three portions of shell 840, including an upper, lower and back portion as shown in FIG. 8A. Alternatively, reinforcing elements may be embedded throughout shell 840, including the upper, lower, right (not shown), left (not shown) and back portions or combinations thereof. Again, shell 860 may be made from plastic or other nonconductive materials while rebars may be made from metals such as steel.

As shown in FIG. 8B, reinforcing element 861 may include undulate rebars 863. The undulating section of the undulate rebar may be limited to of a select number rebars and may be further limited to only a portion of the select number of rebars as shown in FIG. 8B. However, the undulated rebars and the undulated portions of the undulated rebars may be varied. For example, all the rebars of a reinforcing element may be partially undulated or only two rebars may be undulated, but the entire length of the rebar may be undulated. The undulated design may be used because finite element analysis (FEA) of the undulated design establishes advantages in load distribution across a reinforcing element and a shell or may also be used to match the shape of shell 841 or otherwise shaped receptacle connector shells. The use of undulate rebars may be implemented with any of the embodiments of reinforcing elements discussed herein. Thus, while the discussion of patterns of rebars of reinforcing elements discussed was primarily focused on variance in a first and a second dimension, reinforcing elements of the present invention are not limited to a two-dimensional pattern. For example, the rebars of some reinforcing elements may be bent at the ends of the rebars to secure the rebars' embedded position within a receptacle connector shell, e.g., shell 841.

Figure 8C:
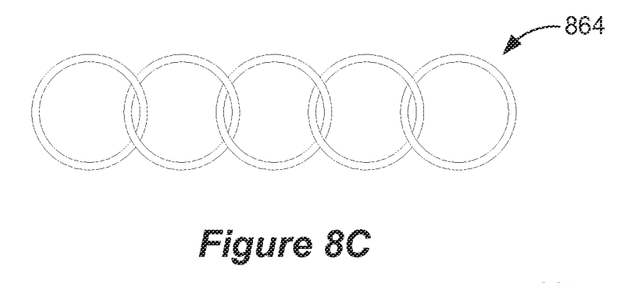
FIGS. 8C-8E illustrate additional embodiments of receptacle connector reinforcing elements according to the present invention.
Figure 8D:
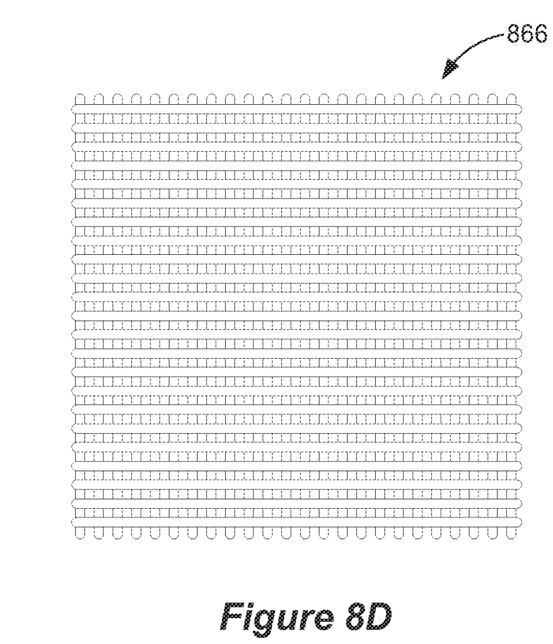
Figure 8E:
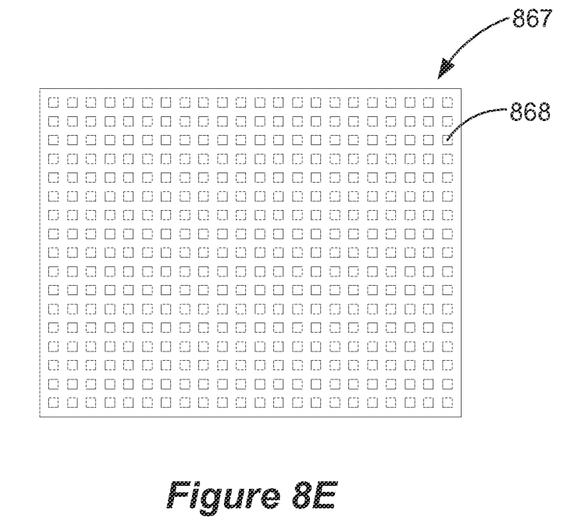

FIGS. 8C-8E illustrate additional embodiments of receptacle connector reinforcing elements according to the present invention. As shown in FIG. 8C, instead of parallel and overlapping perpendicular rebars, reinforcing element 864 includes a number of interlocked rings of rebar. The rings of reinforcing element 864 are arranged in a straight line where each ring is interlocked with the ring immediately adjacent to it. Once interlocked, the rings of reinforcing element 864 could be arranged in a number of different configurations, e.g., a straight line of interlocked rings as shown in FIG. 8C or a series of interlocked rings arranged in a rectangular pattern. Ties or welds, as discussed earlier, may be used in some embodiments to hold the rings of embodiments of reinforcing element 866 in a particular arraignment. Alternatively, one or more rings in a series of rings may be interlocked with more than one ring in the series of rings, e.g., one ring may be interlocked with 2 or 8 rings and another ring may be interlocked with 3 or 10 rings.

In some embodiments, the thickness of the rebars of a reinforcing element may be varied. For example, a dense mesh of relatively thin bars that are easily bendable could be implemented as shown by reinforcing element 866 in FIG. 8D. Flexible reinforcing element 866 made be made from metal, e.g., titanium, nickel or other alloy, such that a single unit of mesh could be bent to be embedded in multiple portions of a connector receptacle shell. These variations and other similar variations may serve to optimize the distribution of loads applied to connector receptacle shells as well as the overall strength of connector receptacle shells.

In other embodiments, a connector receptacle reinforcing element may be a solid structure that includes holes. For example, FIG. 8E shows a reinforcing element 867 including holes 868. Reinforcing element 867 may be a sheet of metal and holes 868 may be formed through a stamping process performed on the sheet metal. Alternatively, reinforcing element 867 may be a molded sheet of metal formed through a casting process to include holes 868. Reinforcing element 867 may also be formed by arranging rebars in a mesh configuration that includes holes. While holes 868 of FIG. 8E are shown as being rectangular shaped holes, holes 868 may also be otherwise shaped. For example, holes 868 may be circular, triangular, or irregularly shaped. When embedded in a receptacle connector shell of a device, reinforcing element 867 may improve the EMI/EMC performance of the device.

As with other examples provided herein, reinforcing element 867 may be made from a variety of materials including metals, but also dielectrics and polymers or a combination thereof. In some embodiments, reinforcing element 867 may be made primarily or exclusively from a metal, such as carbon steel.

In some embodiments, more than one embodiment of a reinforcing element according to the present invention may be implemented within a single receptacle connector shell. For example, one wall of a receptacle connector shell may be embedded with one embodiment of a reinforcing element while another wall of the shell may implement another embodiment of a reinforcing element. As another example, more than one reinforcing element may be embedded within a single portion or wall of a receptacle connector shell; the reinforcing elements may be stacked on top of each other or adjacent to each other in this example. Additionally, as discussed above, embodiments of the present invention may provide receptacle connectors that are configured to accept various different plug connectors implementing a variety of different connector technologies.

In embodiments of the present invention the design variables discussed above, e.g., rebar types, patterns, positioning and others, may be varied to achieve the appropriate balance of receptacle connector shell strength and EMI/EMC performance desired for a particular application. Generally speaking, as the density of a rebar pattern and/or the thickness of the rebars of an embedded reinforcing element increases, so does the strength of the receptacle connector shell and the strength of the shielding provided by the reinforcing element. However, as the density of a rebar pattern and/or the thickness of the rebar of an embedded reinforcing element increases, so does the potential for antenna coupling between the reinforcing element and an antenna of the electronic device. However, for each embodiment discussed herein, an increase in rebar pattern density and/or rebar thickness will yield a different resultant strength, shielding and antenna coupling balance. Accordingly, a suitable embodiment for a particular application will depend on the desired balance of receptacle connector shell strength, connector receptacle shielding and antenna coupling.

VI. Method of Manufacture

It may be desirable to provide an effective manufacturing process for the receptacle connectors discussed above. Accordingly, embodiments of the present invention provide for a method of manufacture for the embedding of reinforcing elements within a receptacle connector shell. For example, reinforcing elements may be embedded in a receptacle connector shell through injection molding, machining, and/or press fitting.

A. Injection Molding

Figure 9A:
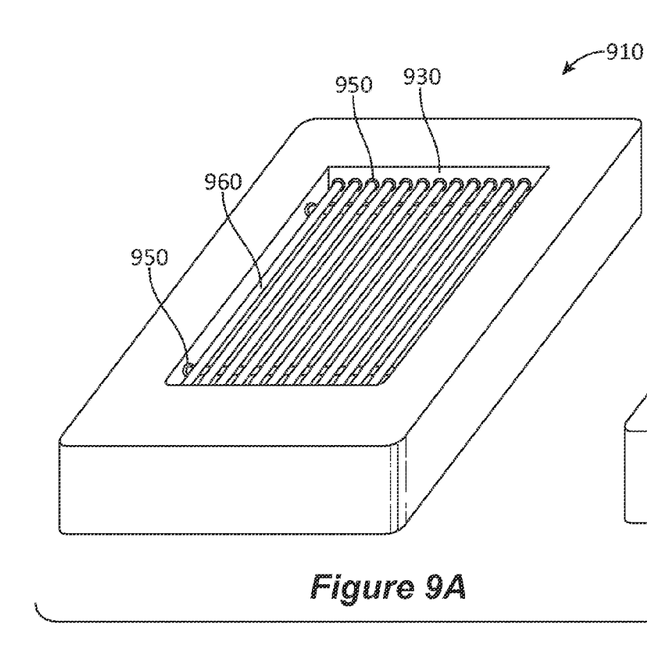
FIGS. 9A-9B illustrate an exemplary die for use in methods of manufacturing according to the present invention.
Figure 9B:
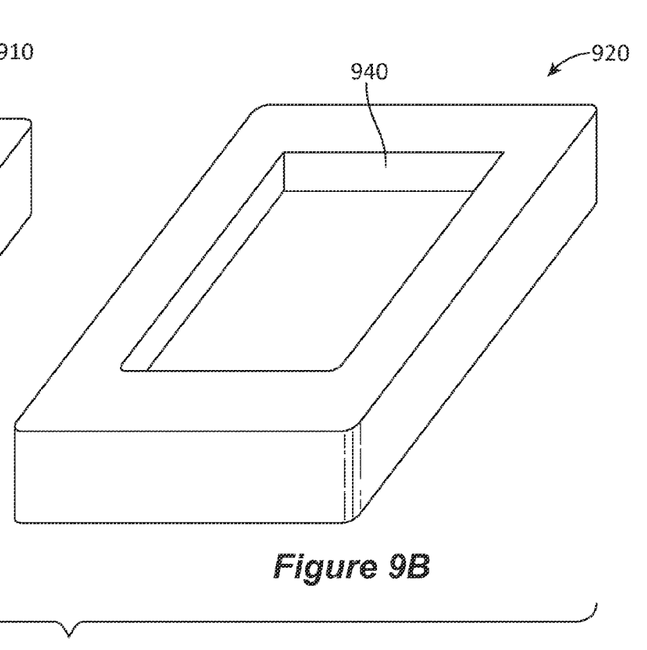

FIGS. 9A-9B illustrate an exemplary die for use in methods of manufacturing according to the present invention. Receptacle connector shells as discussed above may be manufactured as one piece using a die or mold, e.g., die 900 as shown in FIGS. 9A-9B. Die 900 includes a first die portion 910 and a second die portion 920. First and second die portions 910 and 920 may each include a recess, e.g., recesses 930 and 940, such that when die portions 910 and 920 are brought together a composite recess or cavity is formed that is capable of receiving molten resin to form a receptacle connector shell via an injection molding process. Die portions 910 and 920 may also include supports, e.g., supports 950 as shown in FIG. 9A, for suspending reinforcing elements, e.g., reinforcing element 960, within a die recess, e.g., recess 930, during the injection molding process.

While FIG. 9A shows a support 950 for each end of the rebars of reinforcing element 960 provided within recess 930, the number of supports 950 may only be proportional to the number of reinforcing bars included on a reinforcing element, e.g., a support may be included for each end of every other rebar. Supports 950 may also be included within recess 940. Thus, the position of supports 950 may vary so as to facilitate the embedding of a reinforcing element in one or more portions of receptacle connector shells as described above. In some embodiments, supports 950 may be slots into which ends of rebars of reinforcing elements may be inserted. Accordingly, the position and types of supports 950 may vary in order to accommodate the different embodiments of the receptacle connector as discussed herein. Die 900 may also include various other features to assist in the injection molding process, e.g., a spruce, a runner, gates, alignment pins, and/or other features.

Figure 10:
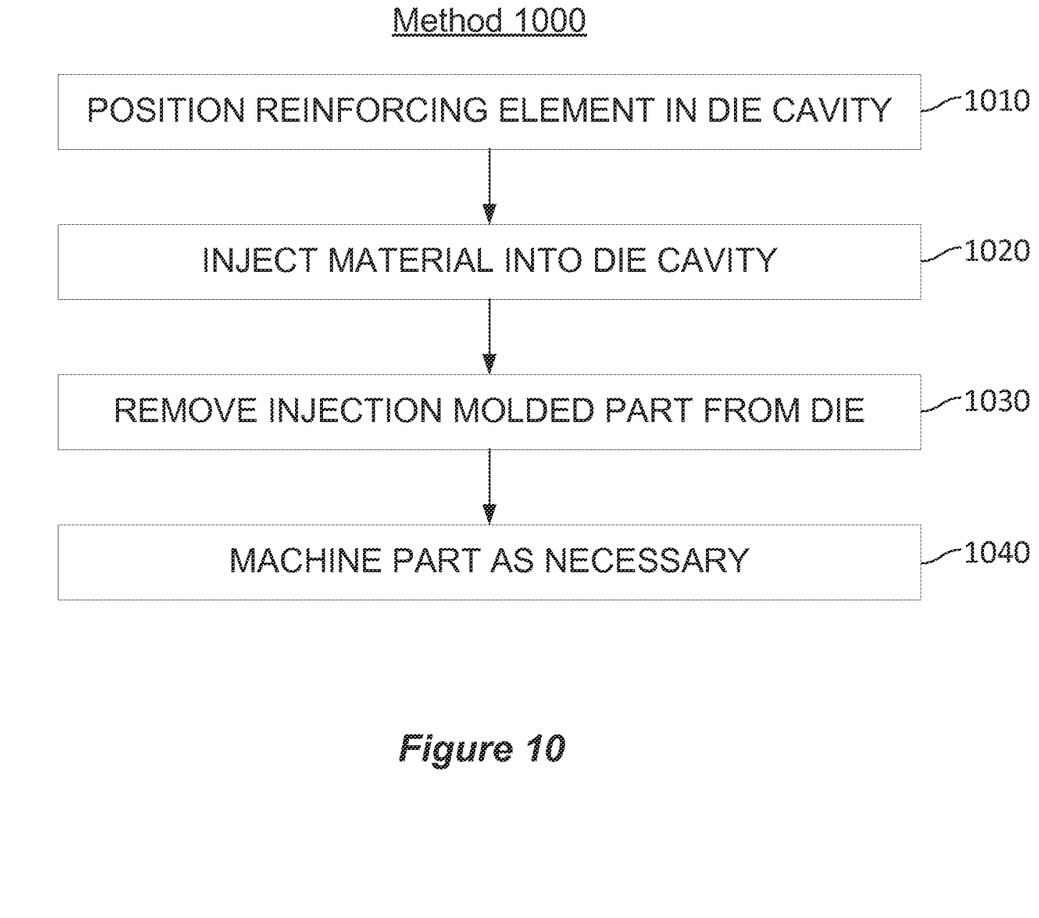
FIG. 10 illustrates a method of manufacture according to an embodiment of the present invention.

FIG. 10 illustrates a method of manufacture according to an embodiment of the present invention. This figure, as with the other included figures, is shown for illustrative purposes and does not limit either the possible embodiments of the present inventions or the claims.

At step 1010, a reinforcing element is positioned or suspended within a die cavity. For example, supports 950 (shown in FIG. 9) may be used to position or suspend a reinforcing element, e.g., reinforcing element 960 (shown in FIG. 9), within a die cavity, e.g., the composite recess formed by recesses 930 and 940 of die 900 (shown in FIG. 9). The positioning of a reinforcing element within a recess of a die may be done manually or may be automated. For example, in embodiments where supports 950 are slots, the ends of the rebars of a reinforcing element may be manually inserted into supports 950. At this point, the die portion, e.g., first die portion 910 and a second die portion 920, may be brought together to form the die cavity with a reinforcing element suspended within the die cavity.

At step 920, material is injected in the die cavity. The material, e.g., thermoplastics, thermosets, and/or elastomers, may be injected by means of an injection molding machine that mixes, heats, and forces the material into a die, e.g., die 900. As discussed earlier, the injection molding process may be aided by a spruce, a runner, gates, and/or other features to assist the flow of the injected material. At the conclusion of this step, the die cavity may be completely filled with the injected material and the injected material may now be in the shape of a connector receptacle shell.

At step 930, the injected molded part is removed from the die. Once the injected material cools, the die may be opened and the part, a receptacle connector shell such as shell 240 as shown in FIG. 2, may be removed or ejected from the die, e.g., by means of ejector pins. The cooling process may accomplish via a coolant being passed through the die to absorb the heat from the die, which was heated by the injected material. At the conclusion of the cooling process the molded part, e.g., the receptacle connector shell, may be in the form of a solid as shaped by the die. The die may be opened by separating the portions of the die leaving the molded part in the recess of one of the die portions, e.g., recess 930 of first die portion 910. In some embodiments, ejector pins, which may be placed in the portion of a die that contains the molded part after the die is opened, may be used to push the molded part out of the recess of a die portion, e.g., die portion 910.

At step 940, the injection molded part may be machined as necessary. This machining step may be used to remove any portion of a reinforcing element that protrudes from the injection molded receptacle connector shell. For example, the ends of the rebar of a reinforcing element that were placed in suspension supports, e.g., supports 950, may protrude from the outer surface of the injection molded receptacle connector shell. For a number of reasons, aesthetic or otherwise, the protruding ends of rebar may be removed at step 940 via machining. As another example, machining may be used to remove any excess material, e.g., flash, on the injection molded receptacle connector shell.

In some embodiments, method 900 may include fewer or additional steps. For example, contacts or other elements of receptacle connectors may be suspended within the die cavity prior to injecting material into the die. As another example, other machining steps may be implemented after step 940 to form features on a receptacle connector shell.

B. Other Methods of Manufacture

In other embodiments portions of receptacle connector shells may be press fit together after placing a reinforcing element between them in order to embed the reinforcing element within the shell. In yet additional embodiments, holes are machined into a receptacle connector shell into which rebars may be inserted and held in place with an adhesive. In other embodiments, metal particles may be mixed in with a material before the material is injection molded into a receptacle connector shell die so as to provide structural and/or EMI/EMC performance advantages.

Also, while a number of specific embodiments were disclosed with specific features, a person of skill in the art will recognize instances where the features of one embodiment can be combined with the features of another embodiment. For example, some specific embodiments of the invention set forth above were illustrated as including only one type of rebar in a reinforcing element. A person of skill in the art will readily appreciate that one or more of any of the other types of rebars discussed herein, as well as others not specifically mentioned, may be used instead of or in combination with any of the rebars shown in embodiments of the reinforcing element discussed herein. Also, those skilled in the art will recognize, or be able to ascertain using no more than routine experimentation, many equivalents to the specific embodiments of the inventions described herein. Such equivalents are intended to be encompassed by the following claims.

What is claimed is:

1. A receptacle connector for an electronic device, the receptacle connector for receiving a corresponding plug connector, the receptacle connector comprising:
   a plurality of contacts configured to mate with corresponding contacts of the corresponding plug connector; and
   a shell having an opening for receiving the corresponding plug connector, the shell comprising:
      an upper portion having an electromagnetic shielding portion adjacent to each of the plurality of contacts; and
      reinforcing bars embedded within and spanning a substantial portion of the electromagnetic shielding portion, the reinforcing bars configured to provide electromagnetic shielding.

2. The receptacle connector of claim 1, wherein the upper portion is adjacent to the corresponding plug connector when the plug connector is inserted into the receptacle connector.

3. The receptacle connector of claim 1, wherein the shell further comprises:
   a lower portion;
   a back portion;
   a right portion; and
   a left portion;
   wherein reinforcing bars are embedded within more than one portion of the shell.

4. The receptacle connector of claim 3, wherein reinforcing bars are also embedded within the lower portion.

5. The receptacle connector of claim 3, wherein reinforcing bars are also embedded within one or more of the left, right and back portions.

6. The receptacle connector of claim 1, wherein the reinforcing bars are in a grid configuration.

7. The receptacle connector of claim 1, wherein the reinforcing bars are in a diagonal grid configuration.

8. The receptacle connector of claim 1, wherein the shell is an injection molded part.

9. The receptacle connector of claim 1, wherein the electronic device is a mobile phone, tablet, or portable media player.

10. The receptacle connector of claim 1, wherein the reinforcing bars are made from carbon steel, nickel, or titanium.

11. The receptacle connector of claim 1, wherein the upper portion is adjacent to an antenna of the electronic device.

12. The receptacle connector of claim 1, wherein the upper portion is made of an insulator material.

13. A receptacle connector for an electronic device, the receptacle connector for receiving a corresponding plug connector, the receptacle connector comprising:
   a plurality of contacts configured to mate with corresponding contacts of the corresponding plug connector; and a shell having an opening for receiving the corresponding plug connector, the shell comprising:
an upper portion having an electromagnetic shielding portion adjacent to each of the plurality of contacts; and
a reinforcing element having holes and embedded within and spanning a substantial portion of the electromagnetic shielding portion, the reinforcing element configured to provide electromagnetic shielding.

14. The receptacle connector of claim 13, wherein the reinforcing element is formed by bar elements configured in a mesh pattern that includes the holes.

15. The receptacle connector of claim 13, wherein the reinforcing element is formed by a sheet of material having the holes.

16. The receptacle connector of claim 13, wherein the upper portion is adjacent to an antenna of the electronic device.

17. The receptacle connector of claim 13, wherein the shell further comprises:
a lower portion;
a back portion;
a right portion; and
a left portion;
wherein the reinforcing element is embedded within more than one portion of the shell.

18. The receptacle connector of claim 13, wherein the reinforcing element is made from carbon steel, nickel, or titanium.

19. A method of manufacturing a receptacle connector for an electronic device, the receptacle connector for receiving a corresponding plug connector, the method comprising:
suspending a plurality of contacts within a die, the die for forming a shell of the receptacle connector, the plurality of contacts suspended in a first region of the die;
suspending a reinforcing element within the die, the reinforcing element suspended in a second region of the die that corresponds to an electromagnetic shielding portion of the shell formed by the die, the second region adjacent to each of the plurality of contacts suspended in the first region, the reinforcing element spanning a substantial portion of the second region, the reinforcing element configured to provide electromagnetic shielding;
injecting material into the die to form at least part of the shell; and
removing the shell from the die.

20. The method of claim 19, wherein the reinforcing element is suspended using supports disposed in one or more recesses of the die into which ends of the reinforcing element may be inserted.

21. The method of claim 19, wherein the reinforcing element comprises reinforcing bars in a grid configuration.

22. The method of claim 19, wherein the reinforcing element is formed by a sheet of material having holes.

23. The method of claim 19, wherein the reinforcing element is suspended in regions of the die corresponding to more than one portion of the shell, and wherein the shell further comprises:
an upper portion, the upper portion including the shielding portion;
a lower portion;
a back portion;
a right portion; and
a left portion.

24. The method of claim 19 further comprising:
machining one or more portions of the reinforcing element that protrude from the shell.

* * * * *